Patented Jan. 16, 1934

1,943,892

UNITED STATES PATENT OFFICE 1,943,892

PURIFICATION OF ORGANIC ACIDS

Alphons O. Jaeger, Mount Lebanon, and Lloyd C. Daniels, Crafton, Pa., assignors to The Selden Company, Pittsburgh, Pa., a corporation of Delaware No Drawing. Application August 8, 1929
Serial No. 384,467

10 Claims. (Cl. 260—108)

In the recovery of aromatic carboxylic acids and their substitution products and derivatives from natural sources and in the preparation of such acids by synthetic processes, it is usually necessary to remove impurities some of which are of a chemical nature not clearly definable. In the case of materials which are commonly purified by distillation or which are subjected to distillation in the further course of a synthetic preparation, such impurities impart to the products an undesirable odor, or color or both. The removal of the impurities to such an extent as to escape detection in the product by fractional distillation is difficult and costly at best and may in some cases even be practically impossible. Other means of purification such as the treatment with an absorption agent as activated charcoal, silica gel, etc. have been tried both with and without fractional distillation.

When the organic acids are to be purified by recrystallization or precipitation of the acid or one or more of its salts, and when two or more organic acids are to be separated from each other by this method, the impurities may not only contaminate the product, but on account of their colloidal nature, may interfere with the carrying out of the purification and separating operations. This interference may result only in slowing down the rate of crystal formation or the rate of filtration or both, but its effect may be even more serious by hindering completeness of crystal formation or precipitation, in which case the yield obtainable is reduced.

We have now found that these interfering impurities can be transformed to a large extent into harmless substances or removed altogether by the treatment of alkali or alkali earth metal salts of aromatic carboxylic acids with compounds of alkali or alkali earth metals having an oxidizing action, such as hypohalites and peroxides. This method is generally applicable in the purification of aromatic carboxylic acids, and of their substitution products and derivatives thereof, which are not attacked by oxidizing agents. The halogen and nitro substituted acids are included.

It is frequently unnecessary to use enough of the oxidizing agent to completely destroy the impurities even when this is possible. The amount of hypohalite used is adjusted to the minimum necessary to effect a change of colloidal impurities into crystallizable compounds or a change of odoriferous or colored impurities into odorless or colorless compounds or compounds of unobjectionable odor. The adjustment of the amount of hypochlorite may be determined by experimentation on a small sample until a standardization to a particular process is attained, the exact amount of oxidizing agent required varying with different acids and with acids prepared by different processes.

In carrying out the purification of the aromatic carboxylic acids or their salts by this method the hypochlorite may be made in a separate vessel and added to the solution or suspension to be treated but a more rapid and efficient action is obtained when it is generated in situ by first adding an excess of the alkali or alkaline earth metal hydroxide, oxide or carbonate used in forming the salt, or a different one if desired and then passing in a halogen. In this way the hypohalite is formed directly in the presence of the material to be treated and is in the nascent state. A further method of treatment, which is especially useful when the presence of appreciable amounts of hypohalite would have a destructive effect on delicate compounds present or when the presence of much alkali would be harmful is to add the excess of caustic in a small stream and pass in a corresponding amount of the halogen simultaneously. In this way a close control of the reaction is obtained and it can be immediately determined when the purification reaction is complete by the presence of free hypohalite.

The amount of hypohalite in the solution or suspension at any time and the progress of the purification reactions can also be closely controlled by adjusting the temperature. Ordinarily the temperature of the batch is maintained at a moderately high degree, say from 45 to 80° C., since the activity of the hypohalite is more satisfactory within these temperatures. Excess hypohalite can be destroyed at any time by heating above 80° C., above which temperature it is unstable, and the speed of the reaction can be diminished by chilling. In the use of ready prepared hypohalite the solution or suspension can be kept cool while the oxidizing agent is added rapidly and the batch then heated to permit the reaction to proceed or a thin stream of the hypohalite may be added in regulated amounts so that a constant but faint test is maintained in the bath at 45 to 80°. Also in the preparation of the hypohalite in situ the halogen may be run rapidly into the batch while the latter is chilled and maintained at a temperature of 20° C. or lower or the consumption of hypohalite may be made to follow closely on its addition to the batch by holding the latter at higher temperatures while the halogen is run in in controlled amounts.

If it is found that too small an amount of hypohalite has been used the batch may be cooled and the addition of caustic and halogen repeated as specified above, or ready prepared hypochlorite solution or technical chloride of lime may be used, since it is an advantage of the present invention that mixtures of various hypohalites, both as to acidic and basic constituents, are as effective and in some cases even more effective than a single compound when used alone. Additional hypochlorite may also be produced in the solution by adding more caustic and introducing chlorine in controlled amounts while the temperature is held to 40 to 60° C., so that a faint test for hypochlorite is maintained until the rate of disappearance of the hypochlorite decreases to such an extent as to show that oxidation of impurities is no longer taking place. In all cases when the purification is complete the excess hypohalite can be removed by heating the solution.

The invention will be described in more detail in connection with the following specific examples, but it is to be understood that the invention is in no sense limited to the specific examples therein set forth.

Example 1

Crude benzoic acid made by vapor phase catalytic decomposition of phthalic anhydride, and containing 70 to 90% benzoic acid with 6 to 15% of phthalic acid, is suspended in 8 to 20 parts of water and neutralized with a slight excess of alkali hydroxide or preferably, carbonate. Undissolved impurities are removed by filtration, using kieselguhr if necessary and effective for speeding up the filtration.

Heat the solution to 45–55° C. Run in slowly a solution of caustic soda equivalent to 5% of the alkali used in neutralizing the acid. At the same time run in chlorine gas equivalent to the rate of addition of the caustic and adjust the flow of both the caustic and the chlorine so that a faint but positive test for hypochlorite is at all times obtainable by trial of samples taken from the bath. When the rate of disappearance of hypochlorite slows down sharply add the remaining caustic rapidly, chlorinate almost to neutrality, and finish off at higher temperatures as previously outlined.

The benzoic acid and phthalic acid may then be separated and isolated by any of the known technical procedures such as by esterification and distillation of the esters or by addition of a strong mineral acid in sufficient quantity to liberate all of the benzoic acid and to convert the secondary phthalate to primary phthalate. No further purification will be found necessary as regards the color of the finished acids except such as is incidental to their separation and isolation.

The purification of phthalic acid in its recovery from lower grades of technical product can be effected by treatment similar to that illustrated above.

Example 2

Using crude benzoic acid made by hydrolysis of side-chain chlorination products of toluene, neutralize with sufficient hydrated lime or finely divided calcium carbonate as a 4 to 6% water suspension. Heat to 80° C. add 2% more lime as quick lime, hydrated lime, or milk of lime. Agitate vigorously and add chloride of lime as long as there is indication of improvement of the color of the benzoic acid by sampling the batch, destroying the hypochlorite in the sample with hydrogen peroxide or ammonia, and acidifying with hydrochloric acid.

The benzoic acid may then be recovered from the calcium salt by precipitation with hydrochloric acid and filtering.

Example 3

Exactly neutralize crude naphthalic acid from vapor phase catalytic oxidation of acenaphthene with 2% sodium hydroxide. Filter off the alkali insoluble by-products. Heat the solution to 80° C. Agitate and run in slowly a solution of sodium hypochlorite made by chlorinating 95–98% of the sodium hydroxide in a 5 to 11% solution of caustic. Stop the addition of bleaching solution when tests of the batch show that the hypochlorite is no longer quickly disappearing and most of the yellowish brown color of the alkali salt solution has been bleached out. Destroy any excess hypochlorite by heating to a higher temperature or adding hydrogen peroxide or ammonia. Cool the batch and filter again if impurities formerly colloidal have been coagulated by the treatment. On acidification a pure white naphthalic acid is obtained, one from which a pure white imide is obtainable.

What is claimed as new is:

1. A method for the purification of substances included in the group consisting of aromatic carboxylic acids and their anhydrides which contain impurities more readily oxidized than the salts of the acids or anhydrides and which salts are not attacked by hypohalites, which comprises transforming the substances into their alkali forming metal salts and subjecting the salts in aqueous dispersion to the action of an oxidizing agent included in the group consisting of hypohalites and peroxides, precipitating the acids from the aqueous dispersion and separating them from the oxidized impurities by filtration.

2. A method according to claim 1, in which the oxidation takes place in the presence of an alkali.

3. A method according to claim 1, in which the substance is a naphthalic acid substance.

4. A method for the purification of substances included in the group consisting of aromatic carboxylic acids and their anhydrides which contain impurities more readily oxidized than the salts of the acids or anhydrides and which salts are not attacked by hypohalites, which comprises transforming the substances into their alkali forming metal salts and subjecting the salts in aqueous dispersion to the action of a hypohalite, precipitating the acids by acidification and separating them from the oxidized impurities by filtration.

5. A method according to claim 4, in which the treatment with the hypohalite is started at a temperature below 80° C. and is raised to a temperature above 80° C. after oxidation of the impurities is complete.

6. A method according to claim 4, in which the substance is a naphthalic acid substance.

7. A method for the purification of substances included in the group consisting of aromatic carboxylic acids and their anhydrides which contain impurities more readily oxidized than the salts of the acids or anhydrides and which salts are not attacked by hypohalites, which comprises transforming the substances into their alkali forming metal salts and subjecting the salts in aqueous dispersion to the action of a hypohalite which is formed in situ by the action of a halogen on caustic alkali, precipitating the acids by acidification and separating them from the oxidized impurities by filtration.

8. The process of claim 7 in which the halogen is chlorine.

9. A method of purifying crude benzoic acid containing impurities which are more easily oxidized than salts of benzoic acid, which comprises forming crude alkali forming metal salts of the crude benzoic acid, subjecting them in aqueous dispersion to the action of an oxidizing agent included in the group consisting of hypohalites and peroxides, precipitating the acids from the aqueous dispersion and separating them from the oxidized impurities by filtration.

10. A method according to claim 9, in which the oxidizing agent is a hypochlorite.

ALPHONS O. JAEGER.
LLOYD C. DANIELS.